A. WINTON & H. B. ANDERSON.
DETACHABLE AND KNOCKDOWN FOLDING SEAT FOR AUTOMOBILE TONNEAUS.
APPLICATION FILED AUG. 25, 1906.

972,046.

Patented Oct. 4, 1910.

UNITED STATES PATENT OFFICE.

ALEXANDER WINTON AND HAROLD B. ANDERSON, OF CLEVELAND, OHIO, ASSIGNORS TO THE WINTON MOTOR CARRIAGE COMPANY, OF CLEVELAND, OHIO.

DETACHABLE AND KNOCKDOWN FOLDING SEAT FOR AUTOMOBILE-TONNEAUS.

972,046.  Specification of Letters Patent.  Patented Oct. 4, 1910.

Application filed August 25, 1906. Serial No. 331,993.

*To all whom it may concern:*

Be it known that we, ALEXANDER WINTON and HAROLD B. ANDERSON, citizens of the United States, residing at Cleveland, in the county of Cuyahoga and State of Ohio, have invented certain new and useful Improvements in Detachable and Knockdown Folding Seats for Automobile - Tonneaus, of which the following is a specification, reference being had therein to the accompanying drawing.

This invention relates to improvements in detachable and knock-down folding seats for automobile tonneaus, whereby one or two additional seats may be readily and quickly set up for use in the tonneau of the automobile, and which can be easily and quickly detached, knocked down, folded and stored under the usual tonneau seat when not in use.

Figure 1:
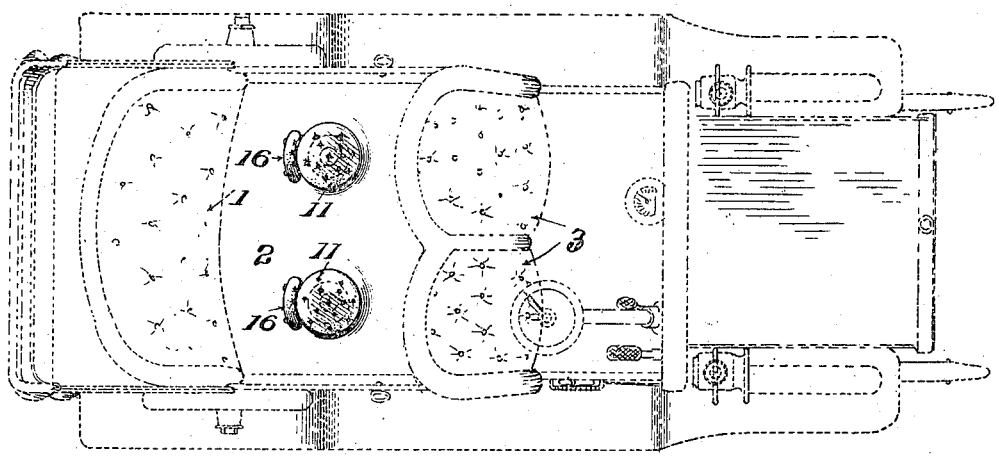
Figure 2:
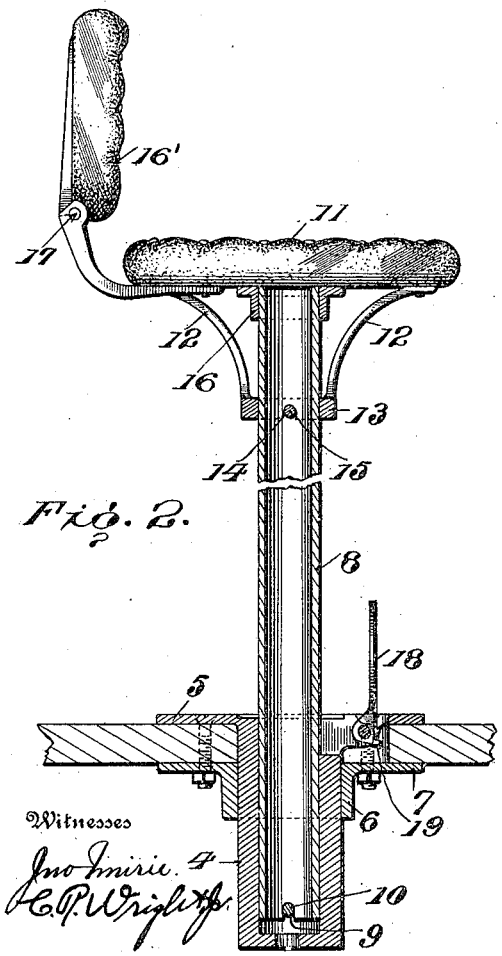
Figure 3:
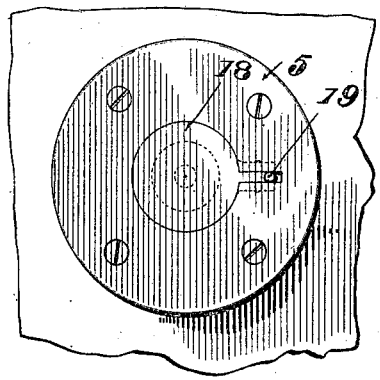

In the accompanying drawings Figure 1 is a top plan view of a tonneau automobile shown in dotted lines, with the present invention in position in the tonneau in full lines. Fig. 2 is an enlarged vertical sectional view of the improved seat shown in position in the bottom of the tonneau. Fig. 3 is a top plan view of the tonneau seat socket with the cover thereof closed.

Reference is now made to the drawing in which 1 is the tonneau seat, and 2 the tonneau floor between the said seat and the front seats 3.

In carrying out the present invention, the floor 2 of the tonneau is provided with depending sockets 4 (preferably two) about midway between the tonneau seat and the front seat, and located (when two are used) at opposite sides of the longitudinal center of the tonneau floor 2. The socket 4 has a thin flange 5 at its upper end which rests in and is suitably secured to the top of the tonneau floor as shown, and a depending bracing socket 6 surrounds the socket 4 below the floor, and is provided with a horizontal flange 7 fitting against and suitably secured to the under side of the floor, which serve to firmly support the socket 4.

A seat supporting member 8 (preferably tubular) fits snugly in the socket, and has a horizontal notch 9 which receives a transverse supporting pin or rod 10, which serves to support the member 8, and to prevent it from turning. The upper end of the member 8 carries a detachable seat portion 11. A downwardly converging spider portion 12 is secured to the under side of the seat portion and carries at its lower end a socket 13 which surrounds the support 8. A transverse notch 14 is formed in the under side of the socket 13, and receives the projecting ends of a pin 15 transversely secured in the support 8 below its upper end. Secured centrally to the under surface of the seat portion 11 is a socket 16 which removably receives the upper extremity of the support 8. The sockets 13 and 16 serve to hold the seat portion firmly in place on the upper end of the support, and the pins 10 and 15 co-acting with their recesses 9 and 14 prevent the support and seat portion from turning under the influence of the side motion or swaying of the occupant of the seat. Attached to the under side of the seat portion is a folding back 16', which is pivoted at a point in a plane above the upper surface of the seat portion 11 so it can be folded down thereon.

In Figs. 1 and 2 the seat is shown in position for use. When it is not in use, the support is removed from the socket and the seat portion from the support, the back folded against the seat portion and the knocked-down parts stored away under the tonneau seat 1, or in other convenient place. The upper ends of the sockets are then closed by means of the hinged covers 18 (as shown in Fig. 3) and the covers are provided with projections 19 by means of which they can be raised when it is desired to put the seat or seats in place.

Having thus described our invention, what we claim and desire to secure by Letters Patent is—

1. The combination with an automobile having a front seat and a tonneau seat in rear thereof and separated therefrom the floor of the tonneau having a depending supporting socket located between the tonneau and front seats, a seat support having its lower end constructed to be detachably supported in said socket, and a seat portion having at its lower side a socket constructed to detachably receive the upper end of said seat support.

2. The combination with an automobile having a front seat and a tonneau seat in rear thereof and separated therefrom the floor of the tonneau having a depending supporting socket located between the said tonneau and front seats, a seat support having its lower end constructed to detachably engage said socket, the socket and seat support constructed to interlock to prevent rotation of the support in the socket, and a seat portion detachably and non-rotatably carried by the upper end of said seat support.

3. The combination with an automobile having a front seat and a tonneau seat in rear thereof, and separated therefrom, the floor of the tonneau having a depending supporting socket located between the tonneau and front seats, a seat support having its lower end constructed to be detachably supported in the socket and held against rotation, and a seat portion having a socket in its lower side constructed to detachably receive the upper end of the seat support and held against rotation on the support.

4. The combination with an automobile having a front seat and a tonneau seat in rear thereof, and separated therefrom, the floor of the tonneau having a depending supporting socket located between the tonneau and front seats, a transverse pin in the lower end of the socket, a seat support constructed to be detachably supported in said socket and having its lower edge provided with a transverse notch to receive the transverse pin of the socket, a transverse pin carried by the upper end of the seat support, and a seat portion having at its lower side a socket constructed to detachably receive the upper end of the said seat support, and having transverse notches to receive the pin carried by the seat support.

5. The combination with an automobile having a front seat and a tonneau seat in rear thereof, and separated therefrom, the floor of the tonneau having a depending supporting socket adapted to detachably receive the seat support, and an upwardly swinging cover for closing said socket when the seat support is removed.

6. The combination with an automobile having a front seat and a tonneau seat in rear thereof, and separated therefrom, the floor of the tonneau between the seats having a depending supporting socket adapted to detachably receive the seat support, and a cover pivotally carried by the socket for closing the same when the seat support is removed, and the cover having an upwardly-extending projection on the outside of its pivotal point whereby the cover is forced open.

7. The combination with an automobile having a front seat and a tonneau seat in rear thereof, the floor of the tonneau having a depending supporting socket located between the tonneau seats, a transverse pin in the lower end of the socket, a seat support composed of a tube adapted to enter the socket and its lower end provided with transverse notches to receive the pin, a transverse pin carried by the upper end of the support, a seat portion having at its lower side a socket constructed to receive the upper end of the support and having transverse notches to receive the pin carried by the seat support, and a cover pivotally carried by the socket for the closing of the same when the seat support is removed and adapted to swing upwardly, and the cover having an upwardly-extending projection on the outside of its pivotal point, whereby the cover is forced upwardly by a downward pressure thereon.

In testimony whereof we affix our signatures in presence of two witnesses.

ALEXANDER WINTON.
HAROLD B. ANDERSON.

Witnesses:
O. F. BAUGHMAN,
W. J. WARD.